Dec. 8, 1936.   P. M. WARNICK ET AL   2,063,773
ELECTRIC MOTOR
Filed March 27, 1935
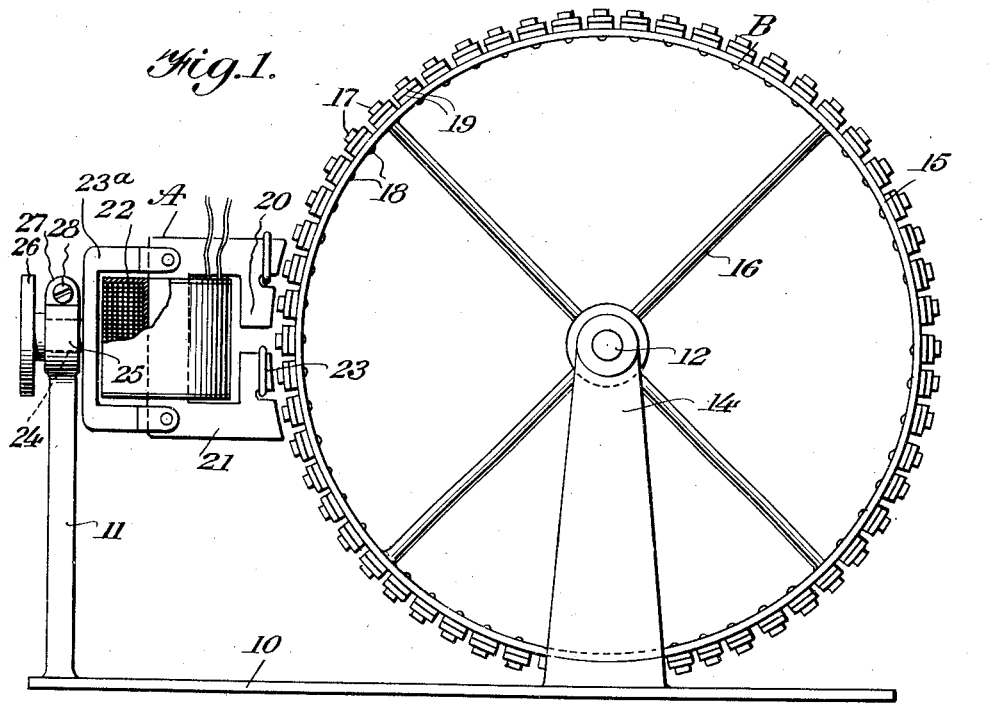
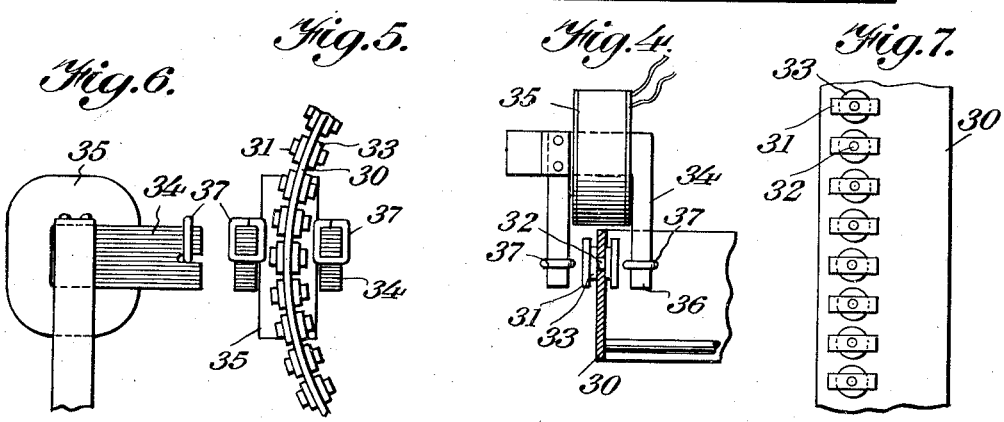
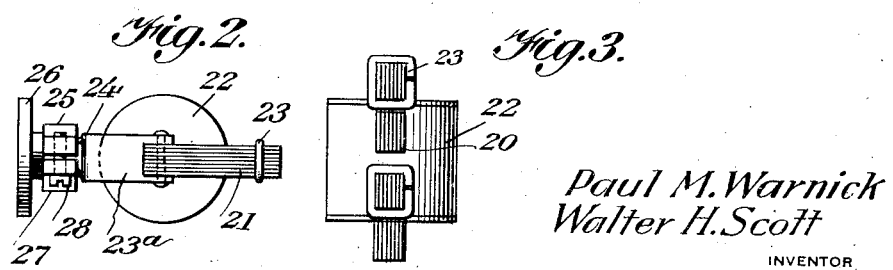
Paul M. Warnick
Walter H. Scott
INVENTOR
BY Victor J. Evans & Co.
ATTORNEYS Patented Dec. 8, 1936

2,063,773

UNITED STATES PATENT OFFICE 2,063,773

ELECTRIC MOTOR

Paul M. Warnick and Walter H. Scott, Chicago, Ill., assignors to John L. Berggren, Chicago, Ill.

Application March 27, 1935, Serial No. 13,354

5 Claims. (Cl. 172—278)

An object of the invention is to provide an electric motor particularly adapted for advertising or display purposes or for the operation of devices in which only low torque is necessary; to provide a motor of the kind indicated in which the rotor is free of sliding contacts, deriving its energy from the stator solely by induction; to provide a motor construction in which the speed of rotation is variable in infinitesimal increments from nothing to full speed solely by the relative adjustment of the rotor and stator; and generally to provide a low torque motor which is of simple form and composed of but few simple parts, thereby making it susceptible of cheap manufacture.

With this object in view the invention consists of a construction and combination of parts, of which preferred embodiments are illustrated in the accompanying drawing, wherein:

Figure 1 is a side elevational view of a motor constructed in accordance with the invention.

Figure 2 is a top plan view of the stator.

Figure 3 is an elevational view of the stator looking at the pole faces thereof.

Figure 4 is a view partly in plan and partly in section of a modified construction of rotor and stator.

Figure 5 is an elevational view looking at the stator pole faces of the structure of Figure 4.

Figure 6 is a side elevational view of the stator of the construction shown in Figures 4 and 5.

Figure 7 is a view of a section of the rim of the rotor of the form shown in Figures 4 to 6, inclusive, but looking at the outer periphery of the same.

The improved motor comprises a stator A and a rotor B, both being mounted preferably on a base 10, the stator being carried by a standard 11 and the rotor being mounted on a shaft 12 journaled in bearings in the upper ends of the pillow blocks 14 which rise from the base.

The rotor comprises preferably a ring 15 of magnetic material carried on arms 16 radiating from the shaft 12 around which they are uniformly spaced angularly.

Set in the ring 15 to project radially from the outer periphery thereof are the rotor poles 17, these being preferably in the form of rivets of magnetic material, headed on the outer ends and having their shanks passed through the rim 15 and peaned, as indicated at 18, on the inner periphery of the ring. Interposed between the heads of the rivets and the outer periphery of the ring are washers 19 which are of non-magnetic material, preferably copper. These washers may be one or more in number. The poles which the rivets 17 constitute are uniformly spaced around the periphery of the rotor ring 15 and pass before the poles 20 of the stator A. The poles 20 are the terminal elements of the stator core 21, which is energized by a coil 22 connected to a suitable supply source. Shading coils 23 are mounted on the pole pieces 20 for the obvious purpose of creating a magnetic lag at one side of the pole pieces, so that there will be a phase difference between the poles appearing at opposite sides of each pole piece. By this arrangement, a starting torque is created to set the rotor in motion.

The winding 22 is energized from an alternating current source and the inductive action of the pole pieces sets up eddy currents in the washers 19 which magnetizes the poles composed of the rivets 17. A series of successive north and south poles is thus established around the rotor, which poles are responsive to the changing polarities in the pole pieces 20 of the stator, so that rotation or turning movement is imparted to the rotor.

The stator is mounted for adjustment angularly on a horizontal axis and to this end the core 21 is carried by a yoke member 23a formed with a cross-sectionally circular stem 24 passing through a split ring portion 25 with which the standard 11 is formed at the upper end. The stem 24 terminates in a hand-knob 26. The ring portion 25 where the split is formed has its two ends outturned to provide ears 27 which are bridged with a clamping screw 28, which may be adjusted, to effect circumferential contraction of the ring and binding engagement on the stem so that any adjustment of the stator is thereby retained. The degree to which the ring binds the stem may be varied so that the stator may be manually adjusted by applying merely a sufficient turning force to overcome the friction; or the adjustment may be such as to positively bind the stem, thereby precluding any adjustment under such conditions.

When the stator is positioned so that its pole pieces lie in a vertical plane, the rotor speed is greatest. If the stator be adjusted to swing the pole pieces into a plane inclined from the vertical, the rotor speed will drop off, and will continue to drop off with the increasing angle of inclination of the plane of the pole pieces from the vertical until the two pole pieces lie in a horizontal plane, when there will be no torque imparted to the rotor and the latter will come to rest. Continued turning movement of the stator in the same direction will reverse the direction of rotation of the rotor, which will gradually increase in speed until the stator pole pieces lie in a vertical plane but in reverse position with respect to their former position. Thus the mounting of the stator for angular adjustment on any radial line of the rotor as an axis will vary the speed of rotation of the rotor from nothing to maximum in either direction.

The modified form of the invention illustrated in Figures 4 to 7, inclusive, comprises a rotor in which the ring 30 is of insulating material, preferably fibre or its equivalent. The rotor poles consist of short rectangular strips 31 of magnetic material disposed on the inner and outer peripheries of the ring 30, each inner strip being connected with a corresponding outer strip by means of a rivet 32, or one of the strips may be formed integrally with the rivet to constitute the head thereof. Washers 33 are interposed between the strips and the ring 30 and are of non-magnetic material, preferably copper, so that eddy currents induced in them may magnetize the strips.

The inductive stator in this form of the invention consists of a U-shaped core 34 energized by a winding 35, the core being U-shaped so that it may straddle the ring at one edge thereof to dispose the poles 36, one opposite the inner periphery of the ring and the other opposite the outer periphery. Shading coils 37 are mounted on the poles 36 to create a phase difference at opposite sides of each pole. This form of the invention provides a comparatively high degree of torque, but does not provide for the easy speed adjustment of the form shown in Figure 1, nor for the ready reversal of rotation of the rotor. The method of rotation in this form, however, is the same as in the form of Figure 1; namely, that of establishing a continuous series of poles around the rotor to be acted upon by the continuously changing poles of the stator.

The invention having been described, what is claimed as new and useful is:

1. An induction motor comprising a stator and a rotor of which the latter is in ring form and provided with radially disposed peripheral members of magnetic material, and ring members of non-magnetic material laid flat on the rotor with one surrounding each of the radial members to magnetize the latter from currents set up by induction from the stator.

2. An induction motor comprising a stator and a rotor of which the latter comprises a relatively large ring of magnetic material, radial members of magnetic material connected with the ring member on its outer periphery and uniformly spaced therearound, and ring members of non-magnetic material laid flat on the rotor with one surrounding each of the radial members to magnetize the latter by currents induced in them by induction from the stator.

3. An induction motor comprising a stator and a rotor of which the latter comprises a relatively large ring of magnetic material, headed studs of magnetic material arranged radially of the ring on the outer periphery of the latter, and washers of non-magnetic material surrounding the studs and interposed between the heads of the latter and periphery of the ring.

4. An induction motor comprising a stator and a rotor of which the latter is provided with means for establishing a continuous series of poles throughout its periphery, the stator being angularly adjustable with a radial line of the rotor as an axis of such adjustment.

5. An induction motor comprising a stator and a rotor, the latter being provided with means for establishing a continuous series of poles at its periphery by the inductive action of the stator, and means for adjusting the stator angularly with a radial line of the rotor as an axis to vary the position of the stator with respect to its inductive relation to the rotor whereby variation in rotor speed from nothing to maximum in either direction may be secured.

PAUL WARNICK.
WALTER H. SCOTT.